May 7, 1940.   J. MIHALYI   2,200,007
FOCUSING ADAPTER
Filed Oct. 28, 1938
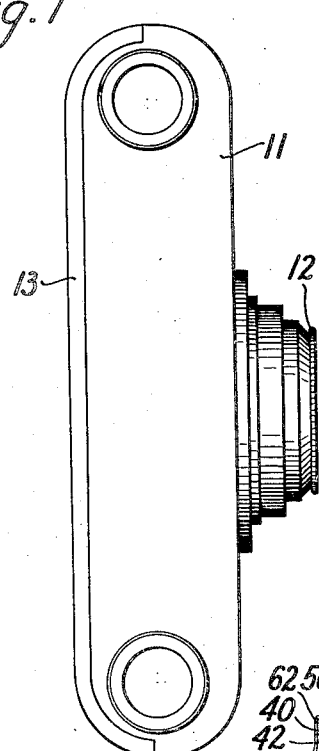
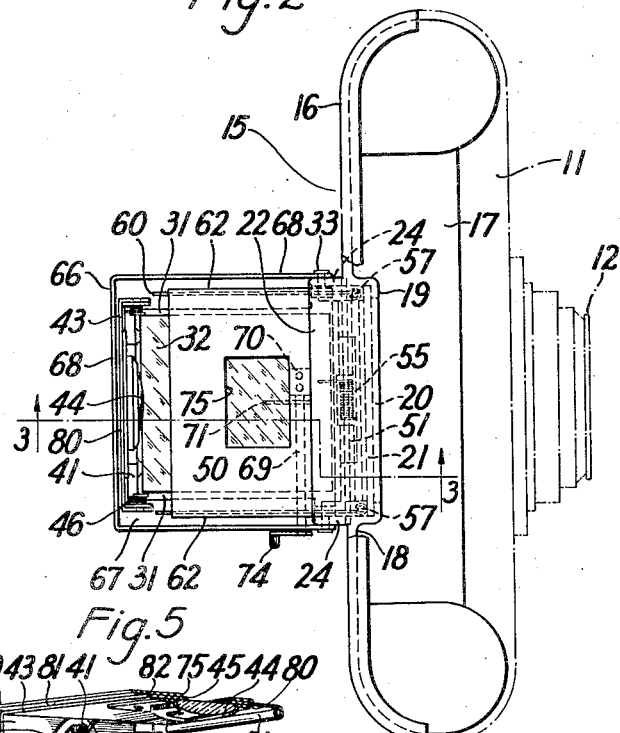
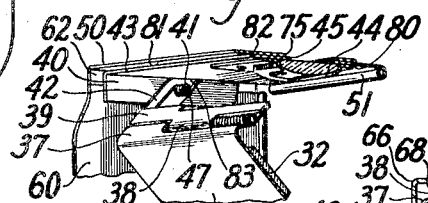
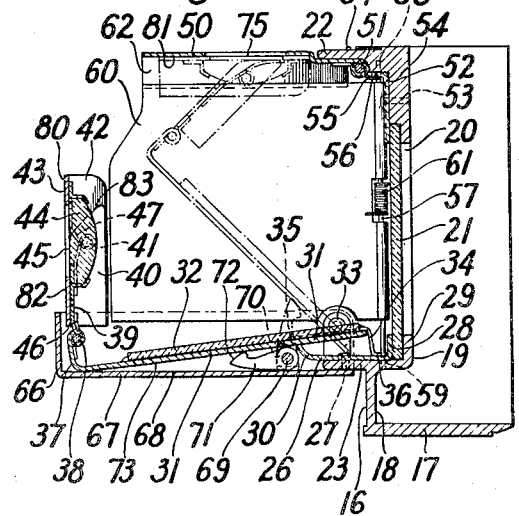
Joseph Mihalyi
INVENTOR
BY Newton N. Perrins
J. Griffin Little
ATTORNEYS Patented May 7, 1940

2,200,007

UNITED STATES PATENT OFFICE 2,200,007

FOCUSING ADAPTER

Joseph Mihalyi, Rochester, N. Y., assignor to Eastman Kodak Company, Rochester, N. Y., a corporation of New Jersey Application October 28, 1938, Serial No. 237,513

8 Claims. (Cl. 95—44)

The present invention relates to folding photographic cameras of the roll film type, and more particularly to a new and improved focusing device for such cameras.

One object of the invention is the provision of a focusing device which can be readily and easily used on cameras of the class described.

Another object of the invention is the provision of a focusing device the parts of which may be quickly and automatically moved to focusing position, and when not in use may be folded or collapsed into a compact unit.

A further object of the invention is the provision of a focusing device which affords three-way focusing.

A still further object of the invention is the provision of a device of the class described which is easy to operate and adjust, and highly effective in use.

To these and other ends, the invention resides in certain improvements and combinations of parts all as will be hereinafter more fully described, the novel features being pointed out in the claims at the end of the specification.

In the drawing:

Fig. 1 is a top view of a roll film camera provided with a removable back;

Fig. 2 is a view similar to Fig. 1, showing the relation to the camera of a focusing adapter constructed in accordance with the present invention, the viewing members being positioned for horizontal viewing of the image on the ground glass focusing screen;

Fig. 3 is a vertical sectional view through the adapter taken substantially on the line 3—3 of Fig. 2, showing the relation of the various parts of the focusing device, and the arrangement by which the parts may be moved to permit either horizontal or vertical viewing of the image on the ground glass focusing screen;

Fig. 4 is a vertical sectional view through the adapter taken substantially on the line 3—3 of Fig. 2, showing the focusing hood and the image viewing members in their collapsed or folded position to afford a compact unit suitable for handling or shipping; and Fig. 5 is a perspective view of a portion of the mechanism illustrated in Fig. 3 showing the relation of certain of the parts when positioned for vertical viewing of the image on the focusing screen.

Similar reference numerals throughout the various views indicate the same parts.

The present invention relates to a focusing adapter arranged to be detachably secured to the back of a folding camera of the roll film type. Such cameras are usually provided with a detachable back which is removed to permit the insertion and/or removal of a roll of film, and the threading of the film across the back of the camera, as is well known. The adapter of the present invention closely resembles a camera back and may be readily substituted therefor during the focusing operation. During such focusing, the film strip must obviously be removed. To facilitate such removal the takeup and supply rolls may be mounted on the camera back, suitable light locks or screens being provided to protect the film against fogging when the camera back is removed. As such a removable camera back does not, however, constitute a part of the present invention a detailed description thereof is not deemed necessary.

In order to focus, the camera back is removed and a focusing adapter, constructed in accordance with the present invention, is substituted therefor. This adapter is provided with a ground glass screen on which the image is focused. Such an image may be viewed horizontally either with the unaided eye, or an enlarged image, or portion therefor, may be view through a suitable lens. This lens is mounted on a mirror which may be swung to an inclined position so that the reflected image may be also viewed vertically. The mirror and lens thus constitute viewing members by which the image on the ground glass screen may be viewed from either the horizontal or vertical position. During the focusing operation the ground glass is shielded by a suitable focusing hood. This hood and the viewing members are normally folded or collapsed to a compact unit on the back of the adapter, but may be released and automatically exploded to the operating position to permit horizontal focusing. After focusing has been completed, the adapter is removed from the camera, and the camera back is replaced so that the film may be exposed to the previously focused picture, all as will be hereinafter described.

The drawing shows a foldable camera of the roll film type which comprises, in general, a body portion 11 on the front of which is mounted an extensible lens 12. The back of the camera is closed by a removable back 13. These parts may be of any suitable or standard construction and do not constitute a part of the present invention.

The focusing adapter, generally indicated by the numeral 15, is placeable on the back of the camera in the position normally occupied by the back 13. This adapter is formed with a back wall 16 which extends across the back of the camera body 11, and a side wall 17 which closes the side of the camera body. Obviously the specific shape of the adapter may be varied to suit the type of camera on which it is to be used. The inner surface 18 of the back wall 16 is formed with a projecting hub or flange 19 having a central opening 20 which is covered by a ground glass focusing screen 21. This screen is positioned in the focal plane of, and is adapted to receive the image formed by, the lens 12 as is well known. The back wall 16 is also formed with a rearwardly extending hollow rectangular flange surrounding the opening 20 and formed with a top and bottom 22 and 23 respectively, and opposite side members 24 which connect the top and bottom members, as clearly shown in Figs. 2, 3, and 4.

A plate 26 is secured to the bottom flange 23 by screws 27, and is formed with a bent up portion 28 which engages the screen 21 and cooperates with a shoulder 29 on the hub 19 to hold the lower end of the screen 21 in position, as shown in Figs. 3 and 4. The opposite end of the plate 26 is bent or curved upwardly, as shown at 30, to support a mirror bracket 31 to be presently described. The mirror bracket 31 comprises a flat plate on which is mounted a mirror 32. The bracket is pivotally mounted at one end on studs 33 which extend through the side members 24 and engage the bracket to pivotally mount one edge of the latter on the adapter. A coil spring 34 surrounds each stud 33 and has one end 35 thereof engaging the bracket 31 and the other end 36 engaging the plate 26, as clearly shown in Figs. 3 and 4. As the studs 33 are arranged close to the right hand edge of the bracket 31, as viewed in Fig. 3, the bracket may be broadly considered as hingedly or pivotally mounted along that edge.

These springs thus tend to hold the bracket 31 in a substantially horizontal position as shown in Fig. 3 for the purpose to be later described. The other end of the bracket 31 is bent upwardly to form a flange 37 on which is hingedly mounted, at 38, a plate or frame 39 the ends of which are formed with upwardly extending arms 40 which overlie and are pivotally mounted at 41 to inwardly turned portions or flanges 42 formed on a lens support 43 on which a reading or viewing lens 44 is mounted. This lens serves to magnify all, or a portion, of the image on the screen, the magnified image being viewable through an aperture 45 in the support 43. A coil spring 46 is wrapped around the hinge 38 and has the ends thereof engaging the flange 37 and the plate 39, as shown in Fig. 3, while a similar spring 47 is wrapped around one of the pivots 41 and has the ends thereof pressing on the support 43, and the plate 39, as shown in Fig. 5 to retain the plate 39 and lens support 43 in the erected position, as shown in Fig. 3.

It is apparent from an inspection of Fig. 3 that the "true" image on the screen 21 may be viewed with the unaided eye by looking directly at the screen over the top of the lens support 43, or the image, somewhat magnified, may be viewed through the lens 44. Thus the image may be viewed horizontally from two independent and separate positions. By "true" image is meant, the image which is actually seen on the screen 21 and not the magnified image which is viewable through the lens 44. As is common practice, a suitable focusing hood is provided for shielding the ground glass screen 21 from stray light during the focusing operation. In the present embodiment of the invention, this hood comprises separate members which are hingedly mounted on the back wall 16 of the adapter 13 adjacent the focusing screen 21.

This lens hood comprises a top member 50 which is hinged at 51 to an L-shaped plate 52 which is secured by screws 53 to the portion 54 of the back wall 16 just above the ground glass screen 21, see Fig. 3. A coil spring 55 is wrapped around the pivot or hinge 51 and has one end thereof in engagement with the member 50 while the other end engages the horizontal portion 56 of the plate 52. This spring 55 serves to rotate the member 50 in a clockwise direction about the hinge 51, as viewed in Fig. 3, until the member engages the top flange 22 which arrests further movement of the member 50. The spring 55 thus cooperates with the flange 22 to retain the member 50 in the erect position, as shown in Fig. 3.

A pair of pins or pintles 57 have the upper ends 58 thereof mounted in opposite ends of the portion 56 of the plate 52. The pins extend downwardly in substantially parallel relation on opposite sides of the opening 20 and have the lower ends 59 thereof secured in the plate 26. Each of these pintles has mounted thereon a flap or side member 60 which is moved outwardly by means of a coil spring 61 wrapped around the pintle 57, as clearly shown in Fig. 3. Depending flanges 62 on opposite edges of the top 50 serve to limit the outward movement of the flap 60 to retain the latter in a position normal to the screen 21, as clearly shown in Fig. 2. These side flaps thus cooperate with the top member 50 and the mirror bracket 31 to form the focusing hoods which surrounds and shields the focusing screen 21, and extends substantially normal from the back wall 16 of the adapter, as is apparent from an inspection of the drawing.

The device above described thus provides a focusing hood which effectively shields the ground glass screen 21 so that the image may be viewed horizontally from two different positions. It is often desirable, however, to focus from the vertical position. To secure this result, the viewing members of the above-described device are so arranged that they may be swung to an operative position to permit such vertical focusing.

To this end a dish-shaped or tray-like cover 66, to be hereinafter more fully described, is formed to provide a bottom 67 and side walls 68 which extend around three sides of the cover. Opposite side walls 68 are pivotally mounted on the studs 33 for the purpose to be later described. As seen in Fig. 3 the bottom 67 cooperates with the curved flange 30 to support the mirror bracket 31. The cover 66 has mounted thereon a rockable shaft 69 one end of which is supported in, and extends beyond one of the side walls 68 while the other end is supported in a bearing 70 secured to the bottom 67, as shown in Fig. 3. A radially extending arm or lever 71 is secured to the shaft 69 and has a portion 72 thereof adapted to engage the under side 73 of the mirror bracket 31 when the shaft is rocked in a clockwise direction, as viewed in Fig. 3. A handle 74 is secured to the outer end of the shaft 69 to move the latter from the full line position to the dotted line position in Fig. 3. When the shaft is thus moved, the portion 72 of the arm 71 engages the under side 73 of the mirror bracket 31 to move the latter and the mirror 32 about its pivot points or studs 33 to the inclined position shown in broken line in Fig. 3. In this inclined position, the mirror 32 will reflect the image of the ground glass vertically so that the reflected image may be viewed through an opening 75 formed on the member 50, as is apparent from an inspection of Fig. 3.

When the bracket 31 is thus moved, the plate 39 and the lens support 43 move, as a unit, therewith until the top edge 80 of the support 43 engages the under surface 81 of the member 50. Upon such engagement, the surface 81 deflects or cams the support 43 to cause the latter to turn on its pivots 41 to bring the outer or left-hand surface 82, Fig. 3, of the support 43 into engagement with the under surface 81 of the member 50, see Fig. 5. When the support 43 has been thus pivoted, it extends substantially horizontal so as to bring the reading lens 44 into registry with the opening 75 so that the reflected image may be magnified by the lens. Beveled portions 83 on the upper ends of the arms 40 limit the pivoting movement of the support 43, as is apparent from an inspection of Figs. 3 and 5. When the parts are thus positioned, as shown in broken line in Fig. 3, the reflected image may be viewed vertically. At this time the portion 72 of the arm 71 is slightly past dead center and thus serves both to retain and lock the viewing parts in position for vertical viewing. It is obvious, of course, that when the shaft 69 is moved in a counter-clockwise direction, the members will be returned to the full line position in Fig. 3 by reason of the coil springs 34, 46, and 47 to permit horizontal viewing, as above described.

When not in use, the viewing members and the focusing hood may be folded or collapsed into a neat compact unit on the back of the adapter as clearly shown in Fig. 4. To secure this result, the flaps 60 are first folded inwardly to lie in overlapping relation adjacent the focusing screen 21. The member 50 is then moved about its pivot 51 to overlie the folded flaps 60, after which the lens support 43 and the plate 39 are moved about their hinge 38 to overlie the mirror 32. The mirror bracket 31 is then swung about its pivots 33 to bring the face or surface 82 of the support 43 into engagement with the top 50, as shown in Fig. 4. In this manner the focusing hood and the viewing members are all collapsed substantially into a plane on the back of the adapter. The parts are then held in the collapsed position by moving the cover 66 about its pivots 33 to the position shown in Fig. 4 at which time the sides 68 of the cover overlie the top and side flange members 22 and 24 to enclose the various members, the curved portion 30 serving to close the open side of the cover 66 to provide a closure member which completely encases the collapsed parts. The cover is preferably held in closed position by a small pin 84 on the top flange 22 which engages a registering opening 85 in adjacent side wall 68 of the cover 66.

When, however, the focusing device is to be used, the cover 66 is swung from the position shown in Fig. 4 to the position shown in Fig. 3. Such movement of the cover enables the springs 36, 46, 47, 55, and 61, to quickly and automatically move or explode the viewing members and the focusing hood to the respective positions shown in Fig. 3 for horizontal viewing.

It is thus apparent from the above description that the present invention provides a focusing device which permits three-way focusing. It is also apparent that the various parts may be quickly and automatically moved to operative position to permit horizontal viewing, and when not in use the parts may be folded or collapsed into a neat compact unit which may be readily handled or shipped. In addition, the viewing members may be swung to a position to permit the image on the ground glass screen to be viewed from a vertical position.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. In a photographic camera, the combination with a camera body, a lens on the front of said body, of a focusing adapter mounted on the back of said body and formed with an opening in alignment with said lens, a ground glass focusing screen positioned in said opening and arranged to receive an image formed by said lens, a mirror hingedly secured to said adapter, a reading lens pivotally mounted on said mirror and spaced from said screen, means for automatically moving said mirror and reading lens to one position so that said image may be viewed from one direction, means for moving said mirror and reading lens as a unit to another position so that the image may be viewed from another direction, and means for locking said reading lens and mirror in said last mentioned position.

2. In a photographic camera, the combination with a camera body, a lens on the front of said body, of a focusing adapter mounted on the back of said body and formed with an opening in alignment with said lens, a ground glass focusing screen positioned in said opening and arranged to receive an image formed by said lens, a mirror hingedly secured to said adapter, a reading lens pivotally mounted on said mirror and spaced from said screen, means for moving said mirror and reading lens to one position so that the image on said screen may be viewed from one direction, means for moving said mirror to an inclined position to reflect said image in another direction, means for moving said reading lens relative to said mirror so that said reflected image may be viewed through said reading lens, and means for retaining said mirror in inclined position.

3. In a photographic camera, the combination with a camera body, a lens on the front of said body, of a focusing adapter mounted on the back of said body and formed with an opening in alignment with said lens, a ground glass focusing screen positioned in said opening and arranged to receive an image formed by said lens, a bracket hingedly mounted along one edge to said adapter, a plate pivotally mounted on the opposite edge of said bracket, a lens support pivotally mounted on said plate, a reading lens mounted in said support, means for moving said bracket to a substantially horizontal position, means for positioning said plate and support in a vertical position when said bracket is so moved so as to enable said image to be viewed horizontally, means for moving said bracket and mirror to an inclined position so that said mirror may reflect said image vertically, means for tilting said support relative to said bracket when the mirror moved to inclined position so that the reflected image may be viewed through said reading lens, and means for locking said bracket in inclined position.

4. In a photographic camera, the combination with a camera body, a lens on the front of said body, of a focusing adapter mounted on the back of said body and formed with an opening in alignment with said lens, a ground glass focusing screen positioned in said opening and arranged to receive an image formed by said lens, a bracket pivotally mounted along one edge to said adapter adjacent said opening, a mirror carried by said bracket, a plate pivotally mounted along the opposite edge of said adapter, a lens support pivotally mounted on said plate, a reading lens mounted in said support, coil springs on the pivots of said bracket for automatically moving the latter to a substantially horizontal position, springs on the pivots of said plate and support for moving these members to an upright position when said bracket is moved to a horizontal position whereby the image on said screen may be viewed directly or an enlarged portion of said image may be viewed through said reading lens, a rock shaft carried by said adapter and arranged to engage said bracket to move the latter about its pivots to move said mirror to an inclined position to reflect said image so that the latter may be viewed vertically, means engaging said lens support to tilt said support relative to said bracket when the latter is moved to the inclined position to bring said lens into alignment with said reflected image, means for locking said bracket in the inclined position and said support in the tilted position, and light shields extending outwardly from said adapter adjacent said screen.

5. In a photographic camera, the combination with a camera body, a lens on the front of said body, of a focusing adapter mounted on the back of said body and formed with an opening in alignment with said lens, a ground glass focusing screen positioned in said opening and arranged to receive an image formed by said lens, a bracket pivotally mounted along one edge to said adapter adjacent said opening, a mirror carried by said bracket, a frame pivotally mounted along the opposite edge of said adapter, a lens support pivotally mounted on said frame, a reading lens mounted on said support, coil springs on the pivots of said bracket for automatically moving the latter to a substantially horizontal position, springs on the pivots of said frame and support for moving these members to an upright position when said bracket is moved to a horizontal position whereby the image on the screen may be viewed directly or an enlarged portion of said image may be viewed through said reading lens, a rock shaft carried by said adapter and arranged to engage said bracket to move the latter about its pivots to move said mirror to an inclined position to reflect said image so that the latter may be viewed vertically, means engaging said lens support to tilt said support relative to said bracket when the latter is moved to the inclined position to bring said reading lens into alignment with said reflected image, means for locking said bracket in the inclined position and said support in the tilted position, light shields extending outwardly from said adapter adjacent said screen, said bracket, frame support, and shields being collapsible substantially into a plane against said adapter, and means for retaining said collapsed relation.

6. In a photographic camera, the combination with a camera body, a lens on the front of said body, of a focusing adapter mounted on the back of said body and formed with an opening in alignment with said lens, a ground glass focusing screen positioned in said opening and arranged to receive an image formed by said lens, image viewing members pivotally mounted on said adapter and collapsible substantially into a plane thereagainst, means for releasably retaining said members in collapsed relation, means for automatically moving said members to erected position upon disengagement of said retaining means to permit viewing of said image from one direction, means for moving said members to another position to permit viewing of said image from another direction, and means for locking said members in said another position.

7. In a photographic camera, the combination with a camera body, a lens on the front of said body, of a focusing adapter mounted on the back of said body and formed with an opening in alignment with said lens, a ground glass focusing screen positioned in said opening and arranged to receive an image focused by said lens, image viewing members pivotally mounted on said adapter and collapsible substantially into a plane thereagainst, a focusing hood surrounding said screen and secured to said adapter, said hood being foldable substantially into the plane of said viewing members, means for releasably retaining said viewing members and said hood in collapsed position, means for automatically moving said hood to open position and said members to erected position upon release of said retaining means to permit viewing of said image from a horizontal direction, a lever mounted on said hood and arranged to engage one of said viewing members to move the latter to another position, means on said hood for tilting the other of said members relative to said one member when the latter is moved to said another position so that said image may be viewed from a different direction, and means on said lever for locking said one member in said another position.

8. In a photographic camera, the combination with a camera body, a lens on the front of said body, of a focusing adapter releasably secured to the back of said body and formed with an opening in alignment with said lens, a ground glass focusing screen positioned in said opening and arranged to receive an image formed by said lens, a hollow rectangular frame formed on said adapter adjacent said screen, a focusing hood secured to said frame, said hood comprising a pair of flap members arranged on spring hinges mounted on opposite sides of said frame, a cover mounted on a spring hinge on another side of said frame, said cover being formed with flanges arranged to engage said flaps to position the latter, a dish-shaped closure member hingedly secured to the remaining side of said frame, said hood being open at the back, image viewing members comprising a bracket hingedly mounted at one end to said frame, a mirror secured to said bracket, a plate pivoted on the other end of said bracket, a support carried by said bracket, a reading lens mounted in said support, springs for automatically moving said bracket and lens to a position in which an enlarged portion of the image on said screen may be viewed horizontally through said reading lens, said support being smaller than the back opening in said hood so that the image on the screen may be viewed horizontally over said support, a lever rockably mounted on said closure member, an arm on said lever arranged to engage said bracket to move the latter and said mirror to an inclined position so that said mirror may reflect said image vertically, said support engaging said cover when said bracket is moved to inclined position to tilt said support relative to said plate to bring said reading lens into registry with an opening in said cover whereby the reflected image may be viewed vertically through said reading lens, said hood and viewing members being collapsible substantially into a plane when said closure member is folded against said adapter and automatically movable to operative position when said closure member is moved to a position normal to said adapter, and cooperating means on said closure member and said frame to retain the collapsed relation.

JOSEPH MIHALYI.